United States Patent [19]

Blondin

[11] Patent Number: 5,034,726
[45] Date of Patent: Jul. 23, 1991

[54] PORTABLE GROUND FAULT DETECTOR

[75] Inventor: Roland R. Blondin, Mississauga, Canada

[73] Assignee: Valvoline Oil & Chemicals Limited, Mississauga, Canada

[21] Appl. No.: 489,157

[22] Filed: Mar. 6, 1990

[51] Int. Cl.⁵ .............................................. G08B 21/00
[52] U.S. Cl. ................................. 340/649; 324/509; 361/215; 361/216
[58] Field of Search ............... 340/649; 324/509–511; 361/42, 212, 215, 216

[56] References Cited

U.S. PATENT DOCUMENTS

| 2,716,216 | 8/1955 | Schwenzfeier | 324/509 |
| 4,649,374 | 3/1987 | Hoigaard | 340/649 |
| 4,691,198 | 9/1987 | Mortensen | 361/215 |
| 4,742,295 | 3/1988 | Nahman et al. | 324/510 |
| 4,901,195 | 2/1990 | Stemporzewski, Jr. | 361/215 |

FOREIGN PATENT DOCUMENTS

| 3210932 | 10/1983 | Fed. Rep. of Germany | 340/649 |
| 0974301 | 11/1982 | U.S.S.R. | 340/649 |

Primary Examiner—Joseph A. Orsino
Assistant Examiner—Jill Jackson
Attorney, Agent, or Firm—Arne I. Fors

[57] ABSTRACT

A portable ground fault detector for use on tanker trucks to provide visual and audible warning of unsafe conditions. Closing of a grounding circuit operating at low voltage permits energizing of a circuit to show safe grounding conditions and interruption of continuity of the grounding circuit provides visual and audible warning of unsafe conditions.

4 Claims, 1 Drawing Sheet

GROUND FAULT DETECTOR
WIRING DIAGRAM

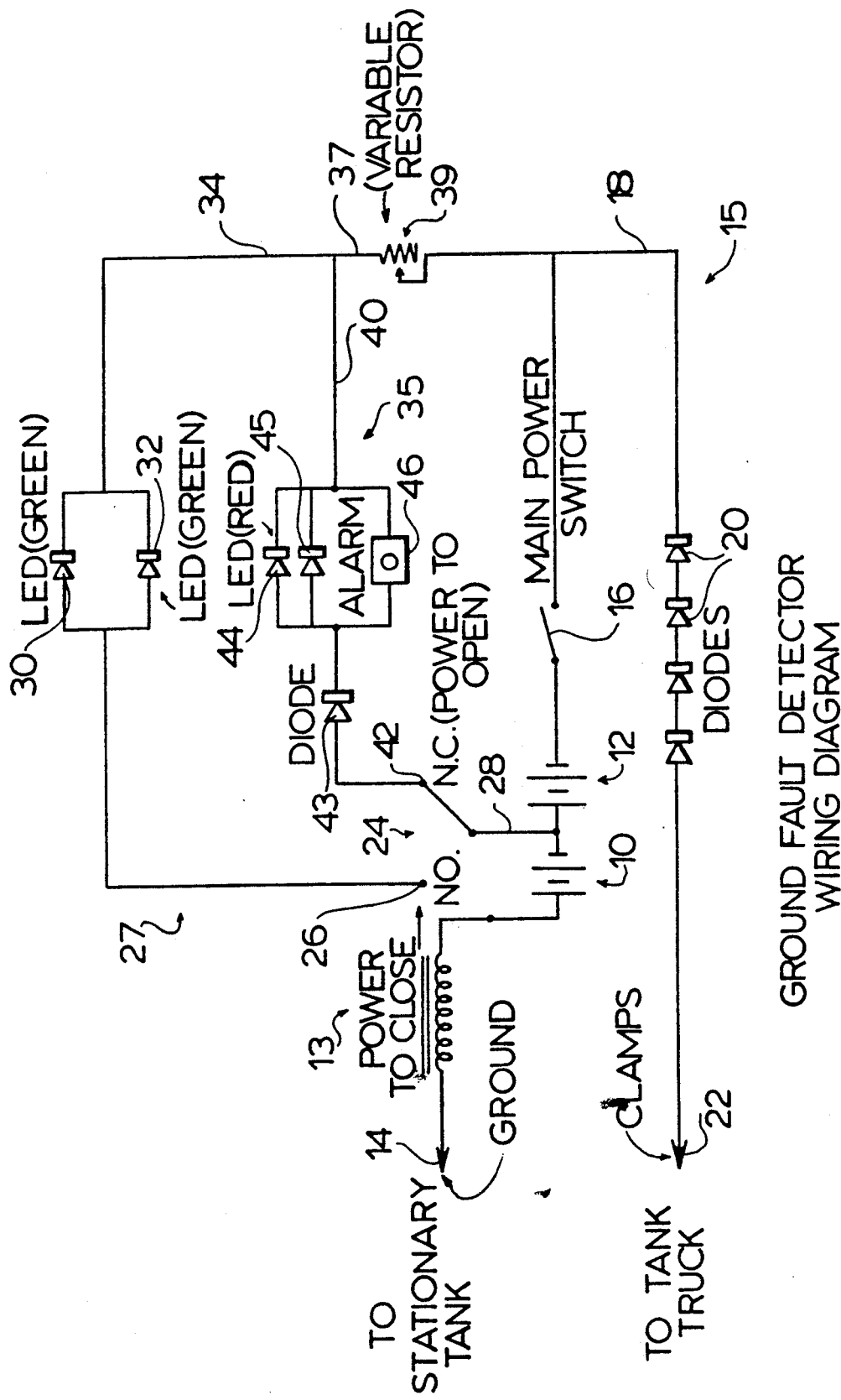

PORTABLE GROUND FAULT DETECTOR

BACKGROUND OF THE INVENTION

The invention relates to a ground fault detector and, more particularly, relates to a ground fault detector for use on tanker trucks.

The transfer of flammable liquids through non-electrical conducting hose from and to tanker trucks has resulted in serious explosions. It is believed that a charge of static electricity generated during the transfer operation creates a hot spark which ignites the flammable gases emitted by the said liquid. It is well known to electrically ground the tanker truck, the tank and related equipment receiving or providing the flammable liquid. However, a faulty ground such as an incomplete ground due to failure in electrical continuity may remain undetected resulting in creation of the danger of an explosion.

U.S. Pat. No. 3,290,668 discloses a grounding and indicating device operating from an AC power supply with a transformer to supply a weak current to a grounding circuit. Closing of the grounding circuit energizes a lamp—photoconductive cell combination which triggers a series of relays for actuating control and warning circuits. This device requires an AC power supply, which often is not available or convenient, poses a risk of sparking due to the presence of the high voltage AC circuitry, and is expensive due to its complexity.

It is an object of the present invention to provide a small and portable ground fault detector for use with tanker trucks transferring flammable liquids. It is desired that the ground fault detector be provided with audio and visual modes for reliable identification of the lack or presence of electrical grounding and for the instantaneous detection of a change in conditions during transfer.

SUMMARY OF THE INVENTION

In its broad aspect, the ground fault detector of the invention comprises a first grounding clamp and a relay electrically connected in series to a battery power supply and a second grounding clamp and a plurality of diodes electrically connected in series to said battery, to form a grounding circuit through an article to be grounded; said relay having switching means with normally—open and normally—closed contacts; a warning circuit electrically connected in series to the battery power supply through the normally—closed contact of the relay—actuated switching means having signalling means to warn of a ground fault condition; and a safe indicating circuit electrically connected in series to the battery power supply through the normally—open contact of the relay—actuated switching means having signalling means to advise a grounded condition during energization of the relay The battery power supply preferably is comprised of a pair of low-voltage batteries, one of which is used to power warning and safe indicating circuits in parallel with the grounding circuit.

BRIEF DESCRIPTION OF THE DRAWING

The present invention will be described with reference to the attached drawing in which the circuit of the invention is shown schematically.

DESCRIPTION OF THE PREFERRED EMBODIMENT

With reference to the drawing, a power supply comprised of a pair of 3-volt batteries 10, 12 in series is connected through relay 13 to ground clamp 14 on its positive side to form a grounding circuit 15 through single-pole single-throw main power off-on switch 16 and line 18 having diodes 20 in series to ground clamp 22. The use of four diodes 20 each having a 0.7 volt drop results in a total voltage drop of 2.8 volts with a net voltage across ground clamps 14, 22 of only (6-2.8) 3.2 volts to ensure a spark-free environment in the event a grounding clamp should be dislodged.

Closing of switch 16 with completion of the circuit between the two ground clamps energizes relay 13 to actuate single pole double throw switch 24 to close normally—open contact 26 of safe condition circuit 27 through lead 28 to the positive terminal of battery 12. Light emitting diodes (green) 30, 32 in parallel are connected to the positive terminal of battery 12 through switch contact 26 and to the negative terminal of battery 12 through line 34 and line 37 having variable preset resistor 39 in series with main switch 16. Closing of switch 16 concurrent with the energizing of relay 13 results in a safe "grounding" condition through ground clamps 14, 22 by completion of the circuit and applies an electrical current to diodes 30, 32 which emits a green light to confirm continuity of the grounding circuit of the system.

A parallel warning circuit 35 comprises battery 12, normally closed contact 42 of switch 24, diode 43 in series, light-emitting diodes (red) 44, 45 and alarm 46 in parallel, and lead 40 to main power switch 16. Interruption of ground continuity due to dislodgement of one or both of clamps 14, 22, breaking of line 18 or the like, will disrupt current flow to and de-energize relay 13 to open switch contact 26 and allow normally—closed contact 42 to close, thereby de-energizing light emitting diodes (green) 30, 32 and energizing light emitting diodes (red) 44, 45 and audible horn alarm 46 to warn of a faulty ground condition.

The ground fault detector circuit of the present invention provides a number of advantages. The power supply comprised of two batteries 10, 12 in series provides sufficient power at 6 volts to operate relay 13 while permitting the ground circuit voltage and amperage across clamps 14, 22 at about 3.2 volts and 50 milliamps, to remain at a safe level which is sufficiently low to obviate a hot spark on opening or closing the grounding circuit. Disruption of the power supply to relay 13 by a ground fault results in energization of an audible signal alarm and a flashing red light emitting diode in parallel while maintenance of a properly grounded condition results in energization of two flashing green light emitting diodes in parallel. A power off condition would be indicated by the absence of lights and sound.

It will be understood, of course, that modifications can be made in the embodiments of the invention illustrated and described herein without departing from the scope and purview of the invention as defined by the appended claims.

I claim:

1. A ground fault detecting device comprising, in combination, a first grounding clamp and a relay electrically connected in series to a battery power supply comprised of a pair of batteries in series and a second grounding clamp and a plurality of diodes electrically connected in series to said battery power supply, to form a grounding circuit through an article to be grounded;

said relay having double throw switching means with a normally—open contact and a normally—closed contact, said switching means being electrically connected between said batteries;

a warning circuit electrically connected in series to the battery power supply through the normally—closed contact of the relay—actuated switching means having signalling means to warn of a ground fault condition; and a safe indicating circuit electrically connected in series to the battery power supply through the normally—open contact of the relay—actuated switching means having signalling means to advise a grounded condition during energization of the relay and closing of said normally—open contact.

2. A ground fault detecting device as claimed in claim 1 in which the safe indicating circuit has a pair of green light-emitting diodes in parallel.

3. A ground fault detecting device as claimed in claim 1 or 2 in which the warning circuit has a pair of red light emitting diodes and an audible alarm all connected in parallel with each other, and a diode in series with said red light emitting diodes and audible alarm.

4. A ground fault detecting device as claimed in claim 1 or 2, said warning and safe indicating circuits having a resistor in series to limit the current.

* * * * *